(12) United States Patent
Naguib et al.

(10) Patent No.: US 7,809,336 B2
(45) Date of Patent: Oct. 5, 2010

(54) RATE SELECTION FOR A QUASI-ORTHOGONAL COMMUNICATION SYSTEM

(75) Inventors: Ayman Fawzy Naguib, Cupertino, CA (US); Alexei Gorokhov, San Diego, CA (US); Tingfang Ji, San Diego, CA (US); Dhananjay Gore, San Diego, CA (US); Arak Sutivong, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1015 days.

(21) Appl. No.: 11/150,417

(22) Filed: Jun. 10, 2005

(65) Prior Publication Data

US 2006/0234646 A1    Oct. 19, 2006

Related U.S. Application Data

(60) Provisional application No. 60/659,641, filed on Mar. 7, 2005.

(51) Int. Cl.
*H04B 1/00* (2006.01)
*H04B 7/00* (2006.01)

(52) U.S. Cl. ............... 455/69; 455/63.1; 455/67.11; 455/67.13; 455/450; 455/452.1; 455/562.1; 370/431; 370/277; 370/208; 370/252; 375/227; 375/267; 375/347; 375/144

(58) Field of Classification Search ........... 455/69, 455/522, 67.11, 67.13, 450, 63.1, 452.1, 455/562.1, 101; 370/277, 208, 252, 431
See application file for complete search history.

(56) References Cited

U.S. PATENT DOCUMENTS 5,202,903 A * 4/1993 Okanoue .................. 375/347
5,351,274 A * 9/1994 Chennakeshu et al. ...... 375/347

(Continued)

FOREIGN PATENT DOCUMENTS

WO    WO 99/40689    8/1999

OTHER PUBLICATIONS

Ratnarajah, T., et al: "Complex Random Matrices and Rayleigh Fading Channel Capacity", Communications in Information Systems, International Press, vol. 3, No. 2 pp. 119-138, Oct. 2003.

(Continued)

*Primary Examiner*—Marceau Milord
(74) *Attorney, Agent, or Firm*—Dmitry R. Milikovsky; Charles E. Eggers

(57) ABSTRACT

To select a rate for a transmitter in a communication system, a receiver obtains a channel response estimate and a received SINR estimate for the transmitter, e.g., based on a pilot received from the transmitter. The receiver computes a hypothesized SINR for the transmitter based on the channel response estimate and the received SINR estimate. The receiver then selects a rate for the transmitter based on (1) the hypothesized SINR and (2) characterized statistics of noise and interference at the receiver for the transmitter, which may be given by a probability density function (PDF) of SINR loss with respect to the hypothesized SINR. A look-up table of rate versus hypothesized SINR may be generated a priori for the PDF of SINR loss. The receiver may then apply the hypothesized SINR for the transmitter to the look-up table, which then provides the rate for the transmitter.

62 Claims, 4 Drawing Sheets

U.S. PATENT DOCUMENTS

| | | | |
|---|---|---|---|
| 5,805,619 A * | 9/1998 | Gardner et al. | 714/814 |
| 6,215,983 B1 * | 4/2001 | Dogan et al. | 455/63.1 |
| 6,362,781 B1 * | 3/2002 | Thomas et al. | 342/383 |
| 6,421,327 B1 * | 7/2002 | Lundby et al. | 370/310 |
| 6,504,506 B1 * | 1/2003 | Thomas et al. | 342/383 |
| 6,678,257 B1 * | 1/2004 | Vijayan et al. | 370/320 |
| 6,690,944 B1 * | 2/2004 | Lee et al. | 455/522 |
| 6,760,313 B1 * | 7/2004 | Sindhushayana et al. | 370/252 |
| 6,802,035 B2 * | 10/2004 | Catreux et al. | 714/746 |
| 6,915,477 B2 * | 7/2005 | Gollamudi et al. | 714/774 |
| 6,922,445 B1 * | 7/2005 | Sampath et al. | 375/267 |
| 6,947,507 B2 * | 9/2005 | Kelkar et al. | 375/347 |
| 6,961,545 B2 * | 11/2005 | Tehrani et al. | 455/101 |
| 6,975,604 B1 * | 12/2005 | Ishida et al. | 370/331 |
| 6,990,137 B2 * | 1/2006 | Smee et al. | 375/142 |
| 7,010,073 B2 * | 3/2006 | Black et al. | 375/355 |
| 7,010,320 B2 * | 3/2006 | Komatsu | 455/522 |
| 7,035,661 B1 * | 4/2006 | Yun | 455/522 |
| 7,085,317 B2 * | 8/2006 | Malladi et al. | 375/232 |
| 7,103,325 B1 * | 9/2006 | Jia et al. | 455/101 |
| 7,106,792 B2 * | 9/2006 | Corbaton et al. | 375/232 |
| 7,133,642 B2 * | 11/2006 | Uesugi | 455/63.1 |
| 7,161,956 B2 * | 1/2007 | Gollamudi et al. | 370/468 |
| 7,170,924 B2 * | 1/2007 | Corbaton et al. | 375/148 |
| 7,206,554 B1 * | 4/2007 | Lindskog | 455/101 |
| 7,206,598 B2 * | 4/2007 | Attar et al. | 455/522 |
| 7,209,517 B2 * | 4/2007 | Sindhushayana et al. | 375/225 |
| 7,215,930 B2 * | 5/2007 | Malladi | 455/67.11 |
| 7,239,847 B2 * | 7/2007 | Attar et al. | 455/63.1 |
| 7,257,094 B2 * | 8/2007 | Shoemake | 370/311 |
| 7,283,578 B2 * | 10/2007 | Lin et al. | 375/130 |
| 7,286,593 B1 * | 10/2007 | Banerjee | 375/148 |
| 7,313,167 B2 * | 12/2007 | Yoon et al. | 375/148 |
| 7,342,912 B1 * | 3/2008 | Kerr et al. | 370/347 |
| 7,349,496 B2 * | 3/2008 | Jia et al. | 375/341 |
| 7,369,549 B2 * | 5/2008 | Wu et al. | 370/389 |
| 7,532,664 B2 * | 5/2009 | Rimini et al. | 375/150 |
| 7,539,240 B2 * | 5/2009 | Cairns et al. | 375/152 |
| 2004/0001462 A1 | 1/2004 | Yavuz et al. | |
| 2004/0213182 A1 | 10/2004 | Huh et al. | |
| 2005/0013352 A1 * | 1/2005 | Hottinen | 375/219 |
| 2005/0099975 A1 * | 5/2005 | Catreux et al. | 370/329 |

OTHER PUBLICATIONS

International Search Report—PCT/US06/008221—International Search Authority, European Patent Office, Jul. 5, 2006.

Written Opinion—PCT/US06/008221—International Search Authority, European Patent Office, Jul. 5, 2006.

International Preliminary Report on Patentability—PCT/US06/008221—The International Bureau of WIPO, Geneva, Switzerland—Sep. 12, 2007.

* cited by examiner

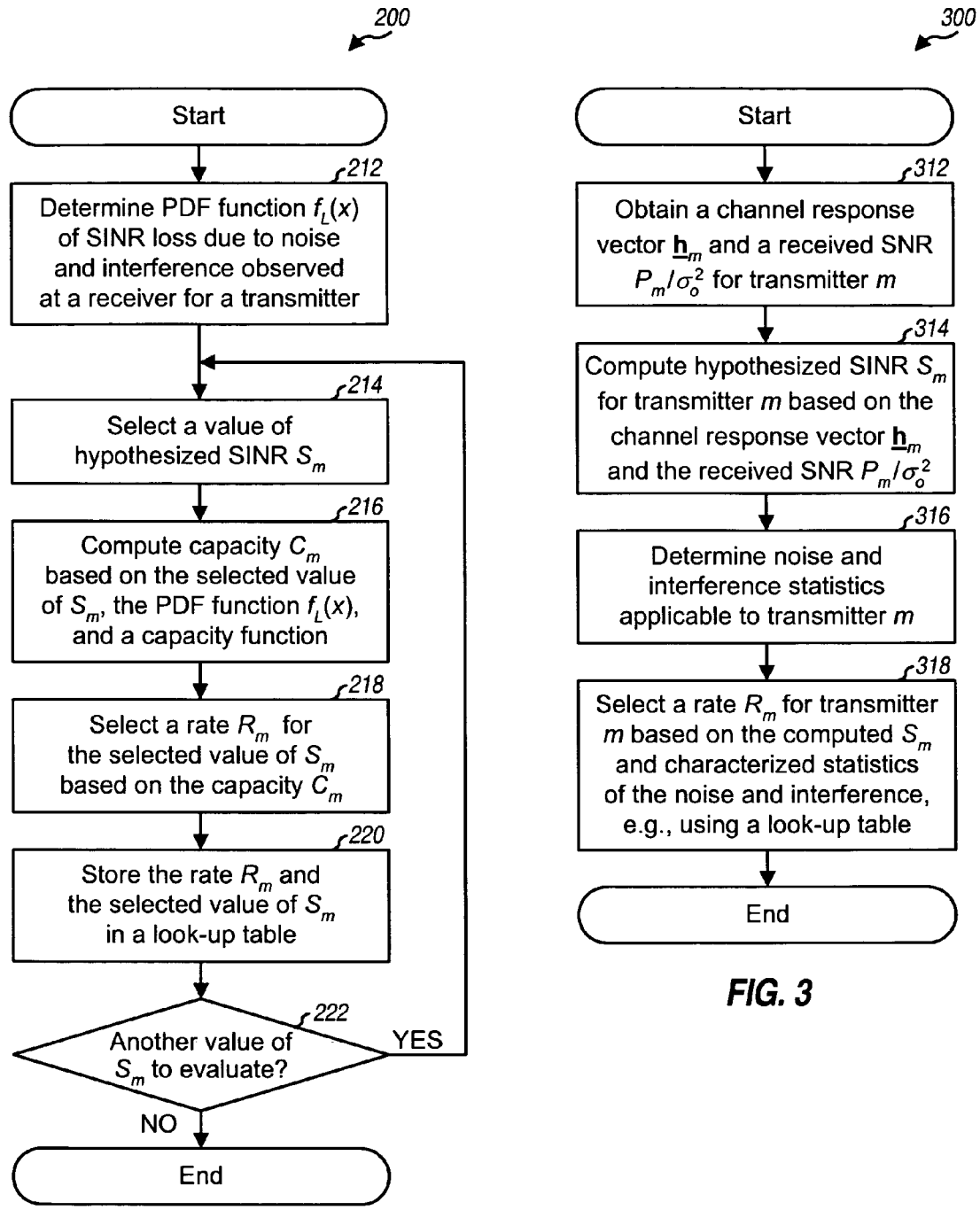

RATE SELECTION FOR A QUASI-ORTHOGONAL COMMUNICATION SYSTEM

CROSS-REFERENCE TO RELATED APPLICATION

This application claims priority to U.S. Provisional Patent Application Ser. No. 60/659,641, filed Mar. 7, 2005 which is incorporated herein by reference in its entirety.

BACKGROUND

I. Field

The present disclosure relates generally to data communication, and more specifically to rate selection for a communication system.

II. Background

A wireless multiple-access communication system can concurrently communicate with multiple terminals on the forward and reverse links. The forward link (or downlink) refers to the communication link from the base stations to the terminals, and the reverse link (or uplink) refers to the communication link from the terminals to the base stations. Multiple terminals may simultaneously transmit data on the reverse link and/or receive data on the forward link. This is often achieved by multiplexing the transmissions on each link to be orthogonal to one another in time, frequency and/or code domain.

The terminals may be distributed throughout the system and may experience different channel conditions (e.g., different fading, multipath, and interference effects). Consequently, these terminals may achieve different signal-to-noise-and-interference ratios (SINRs). The SINR of a traffic channel determines its transmission capability, which is typically quantified by a particular data rate that may be reliably transmitted on the traffic channel. If the SINR varies from terminal to terminal, then the supported data rate would also vary from terminal to terminal. Moreover, since the channel conditions typically vary with time, the supported data rates for the terminals would also vary with time.

Rate control is a major challenge in a multiple-access communication system. Rate control entails controlling the data rate of each terminal based on the channel conditions for the terminal. The goal of rate control should be to maximize the overall throughput while meeting certain quality objectives, which may be quantified by a target packet error rate (PER) and/or some other criterion.

There is therefore a need in the art for techniques to effectively perform rate control in a multiple-access communication system.

SUMMARY

Techniques for selecting a rate for a transmitter in a communication system are described herein. A receiver obtains a channel response estimate and a received SINR estimate for the transmitter, e.g., based on a pilot received from the transmitter. The receiver computes a hypothesized SINR for the transmitter based on the channel response estimate and the received SINR estimate. The receiver then selects a rate for the transmitter based on the hypothesized SINR and characterized statistics of noise and interference at the receiver for the transmitter.

The noise and interference for the transmitter is dependent on various factors such as the number of other transmitters causing interference to this transmitter (which are called co-channel transmitters), the spatial processing technique used by the receiver to recover data transmissions sent by the transmitters, the number of antennas at the receiver, and so on. The characterized statistics of the noise and interference for the transmitter may be given by a probability density function (PDF) of SINR loss with respect to the hypothesized SINR for the transmitter. A look-up table of rate versus hypothesized SINR may be generated a priori for the PDF of SINR loss. For each hypothesized SINR value, a capacity may be computed based on the hypothesized SINR value, the PDF of SINR loss, and a capacity function. The computed capacity may be quantized to a rate supported by the system, and the rate and hypothesized SINR value may be stored in the look-up table. The receiver may then apply the hypothesized SINR for the transmitter to the look-up table, which would provide the rate for the transmitter.

The rate selection techniques described herein are well suited for a quasi-orthogonal communication system in which (1) multiple transmitters can transmit simultaneously on the same frequency subband in the same time interval and (2) the exact noise and interference for the transmitter are not known and only statistics of the noise and interference are available. The exact noise and interference may not be known because, e.g., the channel responses and the transmit powers of the co-channel transmitters are not known.

Various aspects and embodiments of the disclosure are described in further detail below.

BRIEF DESCRIPTION OF THE DRAWINGS

The features and nature of the present disclosure will become more apparent from the detailed description set forth below when taken in conjunction with the drawings in which like reference characters identify correspondingly throughout.

FIG. 2 shows a process for generating a look-up table of rate versus hypothesized SINR according to an embodiment.

FIG. 3 shows a process for selecting a rate for a transmitter according to an embodiment.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
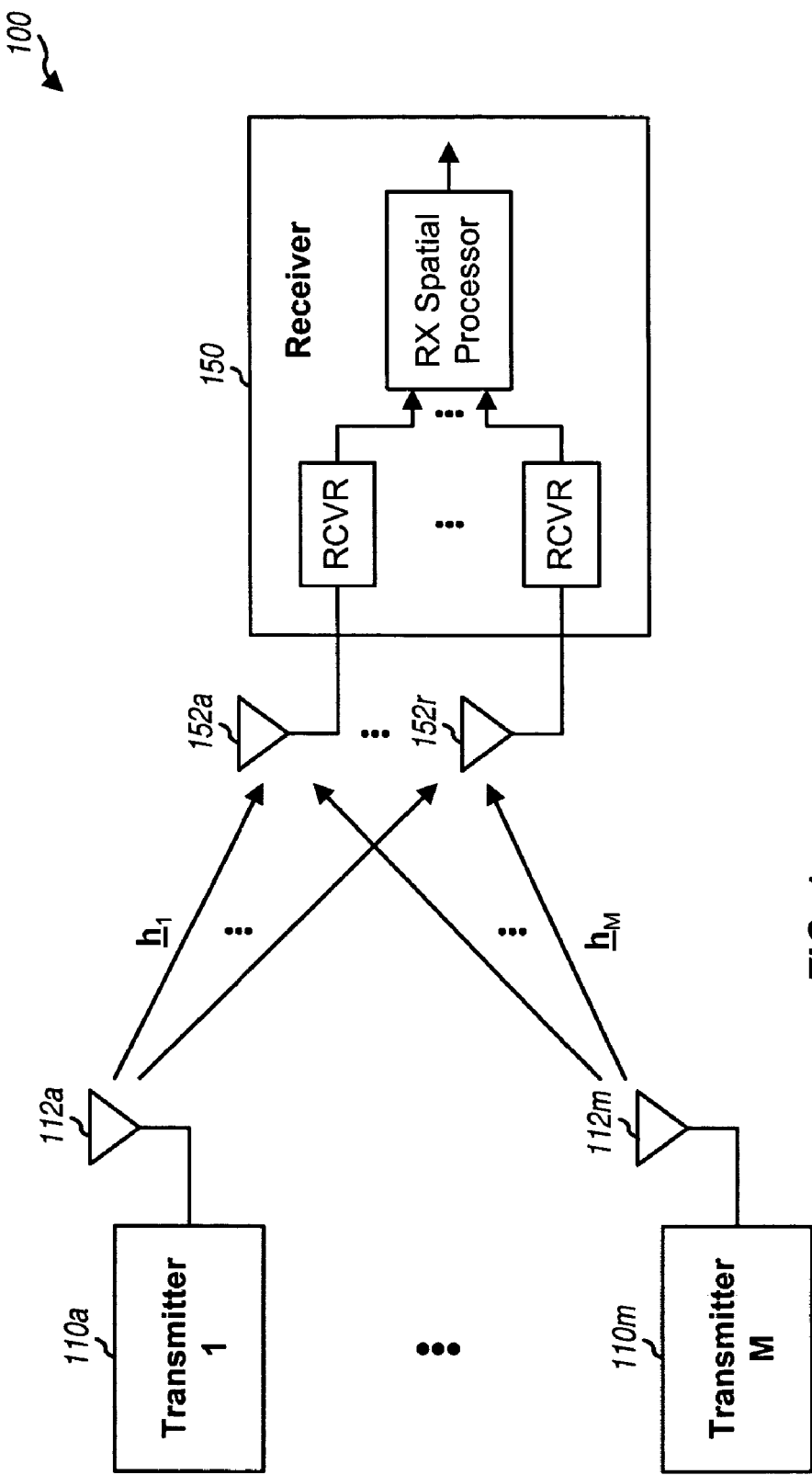
FIG. 1 shows a communication system with multiple transmitters and a receiver according to an embodiment.

FIG. 1 shows a wireless communication system 100 with multiple (M) transmitters 110a through 110m and a receiver 150, where M>1, according to an embodiment. For simplicity, each transmitter 110 is equipped with a single antenna 112, and receiver 150 is equipped with multiple (R) antennas 152a through 152r, where R>1. For the forward link, each transmitter 110 may be part of a base station, and receiver 150 may be part of a terminal. For the reverse link, each transmitter 110 may be part of a terminal, and receiver 150 may be part of a base station. FIG. 1 shows a time instant in which all M terminals 110*a* through 110*m* concurrently transmit to receiver 150 on the same frequency subband in the same time interval. In this case, R≧M.

A single-input multiple-output (SIMO) channel is formed between the single antenna at each transmitter and the R antennas at the receiver. The SIMO channel for transmitter m, for m=1, . . . , M, may be characterized by an R×1 channel response vector $\underline{h}_m$, which may be expressed as:

$$\underline{h}_m = [h_{m,1}\ h_{m,2}\ \ldots\ h_{m,R}]^T, \quad \text{Eq (1)}$$

where entry $h_{m,j}$, for j=1, . . . , R, denotes the complex channel gain between the single antenna at transmitter m and antenna j at the receiver, and "$T$" denotes a transpose. A different SIMO channel is formed between each transmitter and the receiver. The channel response vectors for the M transmitters may be denoted as $\underline{h}_1$ through $\underline{h}_M$ and may be assumed to be independent identically distributed (i.i.d.) complex Gaussian random vectors having the following properties:

$$\underline{h}_m = \underline{N}(0, \underline{R}_h). \quad \text{Eq (2)}$$

Equation (2) indicates that $\underline{h}_m$ has a normal Gaussian distribution, a zero mean vector, and a covariance matrix of $\underline{R}_h$.

Each transmitter may transmit data and/or pilot from its single antenna to the receiver. All M transmitters may transmit simultaneously via their respective SIMO channels to the receiver. The M transmitters may send their transmissions on the same subband in the same time interval. In this case, each transmitter causes interference to the other M−1 transmitters (which are called co-channel transmitters) and also observes interference from the co-channel transmitters.

At the receiver, the received symbols for one subband in one symbol period may be expressed as:

$$\underline{r} = \underline{H} \cdot \underline{s} + \underline{n}, \quad \text{Eq (3)}$$

where $\underline{s}$ is an M×1 vector with M data or pilot symbols sent by the M transmitters;

$\underline{H} = [\underline{h}_1\ \underline{h}_2\ \ldots\ \underline{h}_M]$ is an R×M channel response matrix;

$\underline{n}$ is an R×1 vector of noise and interference at the receiver; and $\underline{r}$ is an R×1 vector with R received symbols from the R antennas at the receiver.

As used herein, a data symbol is a modulation symbol for data, a pilot symbol is a modulation symbol for pilot (which is a transmission that is known a priori by both a transmitter and a receiver), and a modulation symbol is a complex value for a point in a signal constellation (e.g., for PSK, QAM, and so on). For simplicity, indices for subband and symbol period are not shown in equation (3) as well as the equations below.

In equation (3), $\underline{H}$ contains M columns, with each column corresponding to a channel response vector for one transmitter. For simplicity, the noise may be assumed to be additive white Gaussian noise (AWGN) with a zero mean vector and a covariance matrix of $\sigma_o^2 \cdot \underline{I}$, where $\sigma_o^2$ is the thermal noise plus inter-cell interference power (or total noise and inter-cell interference at the receiver) and $\underline{I}$ is the identity matrix.

The receiver may use various receiver spatial processing techniques to separate out the overlapping transmissions sent by the M transmitters. These receiver spatial processing techniques include a minimum mean square error (MMSE) technique, a zero-forcing (ZF) technique, and a maximal ratio combining (MRC) technique. The receiver may derive a spatial filter matrix based on the MMSE, ZF, or MRC technique, as follows:

$$\underline{M}_{mmse} = \underline{D}_{mmse} \cdot [\underline{H}^H \cdot \underline{H} + \sigma_o^2 \cdot \underline{I}]^{-1} \cdot \underline{H}^H, \quad \text{Eq (4)}$$

$$\underline{M}_{zf} = [\underline{H}^H \cdot \underline{H}]^{-1} \cdot \underline{H}^H, \quad \text{Eq (5)}$$

$$\underline{M}_{mrc} = \underline{D}_{mrc} \cdot \underline{H}^H, \quad \text{Eq (6)}$$

where $\underline{D}_{mmse} = \text{diag}\{\underline{M}'_{mmse} \cdot \underline{H}\}^{-1}$ and $\underline{M}'_{mmse} = [\underline{H}^H \cdot \underline{H} + \sigma_o^2 \cdot \underline{I}]^{-1} \cdot \underline{H}^H$;

$\underline{D}_{mrc} = \text{diag}[\underline{H}^H \cdot \underline{H}]^{-1}$; and "$H$" denotes a conjugate transpose.

$\underline{D}_{mmse}$ and $\underline{D}_{mrc}$ are diagonal matrices of scaling values used to obtain normalized estimates of the transmitted data symbols. The receiver may obtain an estimate of $\underline{H}$ based on pilots received from the M transmitters. For simplicity, the description herein assumes no channel estimation error.

The receiver may perform receiver spatial processing as follows:

$$\underline{\hat{s}} = \underline{M} \cdot \underline{r} = \underline{s} + \underline{\tilde{n}}, \quad \text{Eq (7)}$$

where $\underline{M}$ is a spatial filter matrix, which may be equal to $\underline{M}_{mmse}$, $\underline{M}_{zf}$ or $\underline{M}_{mrc}$;

$\underline{\hat{s}}$ is an M−1 vector with M data symbol estimates; and $\underline{\tilde{n}}$ is a vector of noise and interference after the receiver spatial processing.

The data symbol estimates in $\underline{\hat{s}}$ are estimates of the transmitted data symbols in $\underline{s}$.

For the MMSE technique, the post-detection SINR for each transmitter m, which is the SINR after the receiver spatial processing, may be expressed as:

$$\text{SINR}_{mmse,m} = P_m \cdot \underline{h}_m^H \cdot \underline{R}_{mmse,m}^{-1} \cdot \underline{h}_m, \quad \text{Eq (8)}$$

where $P_m$ is the transmit power for transmitter m; and $\underline{R}_{mmse,m}$ is an M×M covariance matrix applicable to transmitter m.

The transmit power for transmitter m may be given as:

$$P_m = P_{ref} + \Delta P_m, \quad \text{Eq (9)}$$

where $P_{ref}$ is a reference power level and $\Delta P_m$ is a transmit power delta. The reference power level is the amount of transmit power needed to achieve a target SINR for a designated transmission, which may be signaling sent by transmitter m on a control channel. The reference power level and the target SINR may be adjusted via one or more power control loops to achieve a desired level of performance for the designated transmission, e.g., 1% PER. The target SINR may be dependent on a rise-power-over-thermal (RpOT) operating point selected for the system. $\Delta P_m$ may be adjusted via another power control loop to maintain inter-cell interference within acceptable levels. The transmit power $P_m$ may also be determined in other manners besides equation (9).

The covariance matrix $\underline{R}_{mmse,m}$ may be expressed as:

$$R_{mmse,m} = \sum_{q=1, q \neq m}^{M} P_q \cdot \underline{h}_q \cdot \underline{h}_q^H + \sigma_o^2 \cdot \underline{I}. \quad \text{Eq (10)}$$

$\underline{R}_{mmse,m}$ is indicative of the total noise and interference observed at the receiver for transmitter m. This total noise and interference includes (1) intra-cell interference from the co-channel transmitters, which is given by the summation of $P_q \cdot$ $\underline{h}_q \cdot \underline{h}_q^H$ for q=1, ..., M and q≠m, and (2) thermal noise and inter-cell interference, which is given by the term $\sigma_o^2 \cdot \underline{I}$.

The ergodic unconstrained capacity for transmitter m, $C_m$, may be expressed as:

$$C_m = \log_2[1 + SINR_m], \quad \text{Eq (11)}$$

where $SINR_m$ is the SINR of transmitter m. The ergodic unconstrained capacity is the theoretical capacity of a communication channel and indicates the maximum data rate that may be reliably transmitted via the communication channel. If the ergodic unconstrained capacity is known for transmitter m, then a suitable rate may be selected for transmitter m such that data is transmitted at or near the capacity of the communication channel for transmitter m.

The ergodic unconstrained capacity is dependent on the SINR of transmitter m, which for the MMSE technique is dependent on the covariance matrix $\underline{R}_{mmse,m}$, as shown in equation (8). $\underline{R}_{mmse,m}$ is in turn dependent on the channel response vectors and the transmit powers for the co-channel transmitters, which may be unknown at the time a rate is to be selected for transmitter m. For example, the system may employ frequency hopping so that each transmitter hops from subband to subband in different time intervals in order to achieve frequency diversity. In this case, transmitter m observes interference from different sets of co-channel transmitters in different time intervals. As another example, transmitter m may have just accessed the system, and the channel response vectors and the transmit powers for the co-channel transmitters may not be known.

Although the channel response vectors, $\underline{h}_q$ for q=1, ..., M and q≠m, and the transmit powers, $P_q$ for q=1, ..., M and q≠m, for the co-channel transmitters may not be known, statistics such as the distribution of the transmit powers and the distribution of the channel response vectors for the co-channel transmitters may be known. Furthermore, the total noise and inter-cell interference $\sigma_o^2$ at the receiver may also be known. An expected or average ergodic unconstrained capacity for transmitter m for the MMSE technique may then be expressed as:

$$C_{mmse,m} = E\{\log_2[1 + SINR_{mmse,m}(\underline{R}_{mmse,m})]\}, \quad \text{Eq (12)}$$

where $E\{\ \}$ is an expectation operation. Equation (12) assumes that the channel response vector $\underline{h}_m$ and the transmit power $P_m$ for the desired transmitter m are known. Hence, the expectation operation in equation (12) is taken over only the distribution of $\underline{R}_{mmse,m}$ (and not over $\underline{h}_m$ and $P_m$, which are assumed to be known). The evaluation of equation (12) may be simplified as described below.

The post-detection SINR in equation (8) may be expressed as:

$$SINR_{mmse,m} = P_m \cdot |\underline{h}_m|^2 \cdot u_m^H \cdot \underline{R}^{-1}_{mmse,m} \cdot u_m, \quad \text{Eq (13)}$$

where $u_m = \underline{h}_m / |\underline{h}_m|$ is a normalized channel response vector for transmitter m. $u_m$ is a unit norm vector obtained by dividing each element of $\underline{h}_m$ by the norm of $\underline{h}_m$. An orthonormal matrix $\underline{U}$ may be defined such that $u_m$ is the m-th column of $\underline{U}$. The orthonormal matrix $\underline{U}$ has the following properties:

$$\underline{U} \cdot \underline{U}^H = \underline{U}^H \cdot \underline{U} = \underline{I} \text{ and } \underline{U}^{-1} = \underline{U}^H. \quad \text{Eq (14)}$$

Equation set (14) indicates that the M rows of the orthonormal matrix $\underline{U}$ are orthogonal to one another, the M columns of $\underline{U}$ are also orthogonal to one another, and each column of $\underline{U}$ has unit power.

Two matrices $\underline{X}$ and $\underline{Y}$ may be defined as follows:

$$\underline{X} = \underline{U}^H \cdot \underline{R}_{mmse,m}^{-1} \cdot \underline{U}, \text{ and} \quad \text{Eq (15)}$$

$$\underline{Y} = \underline{R}_{mmse,m}^{-1}. \quad \text{Eq (16)}$$

It can be shown that matrices $\underline{X}$ and $\underline{Y}$ are identically distributed and that their elements are also identically distributed. To see this, matrix $\underline{X}$ may be rewritten as follows:

$$\begin{aligned}\underline{X} &= \underline{U}^H \cdot \underline{R}_{mmse,m}^{-1} \cdot \underline{U} \\ &= [\underline{U}^{-1} \cdot \underline{R}_{mmse,m} \cdot (\underline{U}^H)^{-1}]^{-1} \\ &= [\underline{U}^H \cdot \underline{R}_{mmse,m} \cdot \underline{U}]^{-1}, \\ &= \left(\sum_{q=1,q\neq m}^{M} P_q \cdot \underline{U}^H \cdot \underline{h}_q \cdot \underline{h}_q^H \cdot \underline{U} + \sigma_o^2 \cdot I \cdot \underline{U}^H \cdot \underline{U}\right)^{-1}, \\ &= \left(\sum_{q=1,q\neq m}^{M} P_q \cdot \underline{v}_q \cdot \underline{v}_q^H + \sigma_o^2 \cdot I\right)^{-1},\end{aligned} \quad \text{Eq (17)}$$

where $v_q = \underline{U}^H \cdot \underline{h}_q$. It can be shown that $\underline{v}_q$ for q=1, ..., M are i.i.d. complex Gaussian random vectors and are distributed as $\underline{N}(0, \underline{R}_h)$.

Matrix $\underline{Y}$ may be rewritten as follows:

$$\underline{Y} = \left(\sum_{q=1,q\neq m}^{M} P_q \cdot \underline{h}_q \cdot \underline{h}_q^H + \sigma_o^2 \cdot I\right)^{-1}. \quad \text{Eq (18)}$$

Comparing equations (17) and (18), it can be seen that $\underline{X}$ and $\underline{Y}$ are identically distributed. Furthermore, the elements of $\underline{X}$ and $\underline{Y}$ are also identically distributed.

A random variable $X_m$ for row m and column m of $\underline{X}$ may be expressed as:

$$X_m = u_m^H \cdot \underline{R}_{mmse,m}^{-1} \cdot u_m. \quad \text{Eq (19)}$$

Equation (19) indicates that the exact value of $X_m$ is dependent on both (1) the normalized channel response vector $u_m$ for transmitter m and (2) the channel response vectors for the co-channel transmitters, which are included in $\underline{R}_{mmse,m}^{-1}$. However, because the elements of $\underline{X}$ and $\underline{Y}$ are identically distributed, the random variable $X_m$ is identically distributed as a random variable $Y_m$ for row m and column m of $\underline{Y}$. Since $\underline{Y}$ is only dependent on the channel response vectors for the co-channel transmitters, the random variable $X_m$ is also dependent only on the co-channel transmitters.

The post-detection SINR of transmitter m in equation (13) may be expressed as:

$$SINR_{mmse,m} = P_m \cdot |\underline{h}_m|^2 \cdot \underline{u}_m^H \cdot \underline{R}_{mmse,m}^{-1} \cdot u_m = S_m \cdot L_{mmse}, \quad \text{Eq (20)}$$

$$\text{where } S_m = \frac{P_m}{\sigma_o^2} \cdot |\underline{h}_m|^2, \quad \text{Eq (21)}$$

$$L_{mmse} = \underline{u}_m^H \cdot \sigma_o^2 \cdot \underline{R}_{mmse,m}^{-1} \cdot u_m, \text{ and} \quad \text{Eq (22)}$$

$$\sigma_o^2 \cdot \underline{R}_{mmse,m}^{-1} = \left(\sum_{q=1,q\neq m}^{M} \frac{P_q}{\sigma_o^2} \cdot \underline{h}_q \cdot \underline{h}_q^H + I\right)^{-1}. \quad \text{Eq (23)}$$

In equations (20) through (23), $S_m$ represents a hypothesized SINR for transmitter m after the receiver spatial processing if there is no interference from other transmitters. $S_m$ is dependent on the received SINR $P_m/\sigma_o^2$ and the channel norm $|\underline{h}_m|^2$ for transmitter m. $L_{mmse}$ represents the SINR loss with respect to the hypothesized SINR due to the presence of interference from the co-channel transmitters with the MMSE technique.

For the zero-forcing technique, the post-detection SINR for each transmitter m may be expressed as:

$$SINR_{zf,m} = \frac{P_m}{R_{zf,m}}, \quad \text{Eq (24)}$$

where $R_{zf,m}$ is the first diagonal element of an M×M covariance matrix $\underline{R}_{zf,m}$ for the zero-forcing technique. $\underline{R}_{zf,m}$ may be expressed as:

$$\underline{R}_{zf,m} = \sigma_o^2 \cdot (\underline{H}_m^H \cdot \underline{H}_m)^{-1}. \quad \text{Eq (25)}$$

where $\underline{H}_m$ is a re-ordered version of $\underline{H}$ and contains $\underline{h}_m$ in the first column.

Matrix $(\underline{H}_m^H \cdot \underline{H}_m)^{-1}$ may be expressed as:

$$(\underline{H}_m^H \cdot \underline{H}_m)^{-1} = \begin{bmatrix} \underline{h}_m^H \cdot \underline{h}_m & \underline{h}_m^H \cdot \underline{A} \\ \underline{A} \cdot \underline{h}_m & \underline{A}^H \cdot \underline{A} \end{bmatrix}^{-1}, \quad \text{Eq (26)}$$

where $\underline{A} = [\underline{h}_1 \ldots \underline{h}_{m-1} \, \underline{h}_{m+1} \ldots \underline{h}_M]$ is an R×(M−1) matrix containing all columns of $\underline{H}$ except for $\underline{h}_m$. $R_{zf,m}$ is the (1,1) element of $\sigma_o^2 \cdot (\underline{H}_m^H \cdot \underline{H}_m)^{-1}$ and may be expressed as:

$$\begin{aligned} R_{zf,m} &= \sigma_o^2 \cdot [\underline{h}_m^H \cdot \underline{h}_m - \underline{h}_m^H \cdot \underline{A} \cdot (\underline{A}^H \cdot \underline{A})^{-1} \cdot \underline{A}^H \cdot \underline{h}_m]^{-1}, \\ &= \sigma_o^2 \cdot [|\underline{h}_m|^2 \cdot (1 - \underline{u}_m^H \cdot \underline{A} \cdot (\underline{A}^H \cdot \underline{A})^{-1} \cdot \underline{A}^H \cdot \underline{u}_m)]^{-1}, \\ &= \sigma_o^2 \cdot [|\underline{h}_m|^2 \cdot (1 - Z_m)]^{-1}, \end{aligned} \quad \text{Eq (27)}$$

where $\underline{u}_m = \underline{h}_m/|\underline{h}_m|$ and $Z_m = \underline{u}_m^H \cdot \underline{A} \cdot (\underline{A}^H \cdot \underline{A})^{-1} \cdot \underline{A}^H \cdot \underline{u}_m$.

An orthonormal matrix $\underline{U}$ may be defined such that $\underline{u}_m$ is the first column of $\underline{U}$. A matrix $\underline{V}$ may be defined as:

$$\begin{aligned} \underline{V} &= \underline{U}^H \cdot \underline{A} \cdot (\underline{A}^H \cdot \underline{A})^{-1} \cdot \underline{A}^H \cdot \underline{U}, \\ &= \underline{U}^H \cdot \underline{A} \cdot (\underline{A}^H \cdot \underline{U} \cdot \underline{U}^H \cdot \underline{A})^{-1} \cdot \underline{A}^H \cdot \underline{U}, \\ &= \underline{B} \cdot (\underline{B}^H \cdot \underline{B})^{-1} \cdot \underline{B}^H, \end{aligned} \quad \text{Eq (28)}$$

where $\underline{B} = \underline{U}^H \cdot \underline{A}$. As indicated by equation (28), $\underline{U}^H \cdot \underline{A} \cdot (\underline{A}^H \cdot \underline{A})^{-1} \cdot \underline{A}^H \cdot \underline{U}$ has the same distribution as $\underline{B} \cdot (\underline{B}^H \cdot \underline{B})^{-1} \cdot \underline{B}^H$, which has the same distribution as $\underline{A} \cdot (\underline{A}^H \cdot \underline{A})^{-1} \cdot \underline{A}^H$. This results from (1) the columns of $\underline{A}$ being i.i.d. complex Gaussian random vectors and distributed as $\underline{N}(0, \underline{R}_h)$ and (2) the multiplications with $\underline{U}^H$ and $\underline{U}$ being unitary transformations. Hence, random variable $Z_m$ for $\underline{u}_m^H \cdot \underline{A} \cdot (\underline{A}^H \cdot \underline{A})^{-1} \cdot \underline{A}^H \cdot \underline{u}_m$ is distributed as the (1,1) element of $\underline{B} \cdot (\underline{B}^H \cdot \underline{B})^{-1} \cdot \underline{B}^H$.

The post-detection SINR in equation (24) for the zero-forcing technique may then be expressed as:

$$SINR_{zf,m} = \frac{P_m}{\sigma_o^2} \cdot |\underline{h}_m|^2 \cdot (1 - Z_m) = S_m \cdot (1 - Z_m) = S_m \cdot L_{zf}, \quad \text{Eq (29)}$$

where $$S_m = \frac{P_m}{\sigma_o^2} \cdot |\underline{h}_m|^2$$

and $$L_{zf} = 1 - Z_m.$$

$S_m$ represents the hypothesized SINR for transmitter m with no interference from other transmitters. $L_{zf}$ represents the SINR loss due to the presence of interference from the co-channel transmitters with the zero-forcing technique.

For the MRC technique, the post-detection SINR for each transmitter m may be expressed as:

$$SINR_{mrc,m} = \frac{P_m \cdot (|\underline{h}_m|^2)^2}{\underline{h}_m^H \cdot \underline{R}_{mrc,m} \cdot \underline{h}_m} = \frac{P_m \cdot |\underline{h}_m|^2}{\underline{u}_m^H \cdot \underline{R}_{mrc,m} \cdot \underline{u}_m}, \quad \text{Eq (30)}$$

where $\underline{u}_m = \underline{h}_m/|\underline{h}_m|$ and $$\underline{R}_{mrc,m} = \sum_{q=1, q \neq m}^{M} P_q \cdot \underline{h}_q \cdot \underline{h}_q^H + \sigma_o^2 \cdot \underline{I}. \quad \text{Eq (31)}$$

A matrix $\underline{C}$ may be defined as:

$$\underline{C} = \underline{U}^H \cdot \underline{R}_{mrc,m} \cdot \underline{U}, \quad \text{Eq (32)}$$

where $\underline{U}$ is an orthonormal matrix containing $\underline{u}_m$ as the m-th column.

A random variable $M_m$ for the (m, m) element of $\underline{C}$ may be expressed as:

$$M_m = \underline{u}_m^H \cdot \underline{R}_{mrc,m} \cdot \underline{u}_m. \quad \text{Eq (33)}$$

It can be shown that random variable $M_m$ is distributed as the (m, m) element of $\underline{R}_{mrc,m}$.

The post-detection SINR in equation (30) for the MRC technique may then be expressed as:

$$SINR_{mrc,m} = \frac{P_m \cdot |\underline{h}_m|^2}{\sigma_o^2 \cdot (M_m/\sigma_o^2)} = S_m \cdot L_{mrc}, \quad \text{Eq (34)}$$

where $S_m = \frac{P_m}{\sigma_o^2} \cdot |\underline{h}_m|^2$ and $L_{mrc} = \sigma_o^2 \cdot M_m$.

$L_{mrc}$ represents the SINR loss due to the presence of interference from the co-channel transmitters with the MRC technique.

In general, the post-detection SINR for each terminal m may be expressed as:

$$SINR_m = S_m \cdot L_m, \quad \text{Eq (35)}$$

where $L_m$ is the SINR loss due to interference from the co-channel transmitters and may be equal to $L_{mmse}$, $L_{zf}$ or $L_{mrc}$.

The average ergodic unconstrained capacity may be expressed as:

$$C_m = \int_x \log_2[1 + S_m \cdot L_m] \cdot f_L(x) \cdot dx, \quad \text{Eq (36)}$$

where $f_L(x)$ is a probability density function (PDF) of the random variable $L_m$. The function $f_L(x)$ is dependent on the receiver spatial processing technique selected for use, e.g., MMSE, zero-forcing, or MRC. The expectation operation over $SINR_m$ in equation (12) is replaced by an integration over $f_L(x)$ in equation (36). $f_L(x)$ may be determined analytically by using the properties of the complex Wishart distribution of complex random matrices. $f_L(x)$ may also be determined via computer simulations (e.g., Monte Carlo simulations), by empirical measurements in the field, or by some other means.

Equation (36) provides an average unconstrained capacity of a communication channel for a transmitter. A constrained capacity of the communication channel is further dependent on a specific modulation scheme used for data transmission. The constrained spectral efficiency (due to the fact that the modulation symbols are restricted to specific points on a signal constellation) is lower than the unconstrained capacity (which is not confined by any signal constellation).

The constrained capacity for transmitter m may be expressed as:

$$C_m = B - \frac{1}{2^B} \sum_{i=1}^{2^B} E\left(\log_2 \sum_{j=1}^{2^B} \exp(-SINR_m \cdot (|a_i - a_j|^2 + 2\mathrm{Re}\{\beta^*(a_i - a_j)\}))\right), \quad \text{Eq (37)}$$

where
  B is the number of bits for each signal point in a $2^B$-ary signal constellation;
  $\alpha_i$ and $\alpha_j$ are signal points in the $2^B$-ary signal constellation; and
  $\beta$ is a complex Gaussian random variable with zero mean and variance of $1/SINR_m$.

The $2^B$-ary signal constellation contains $2^B$ signal points for a specific modulation scheme, e.g., QPSK, 16-QAM, and so on. Each signal point is a complex value that may be used for a modulation symbol. The expectation operation in equation (37) is taken with respect to the random variable $\beta$. The constrained capacity in equation (37) is a function of the signal points in the constellation as well as $SINR_m$.

The average constrained capacity for transmitter m may be expressed as:

$$C_m = \int_x \left( B - \frac{1}{2^B} \sum_{i=1}^{2^B} E\left(\log_2 \sum_{j=1}^{2^B} \exp(-S_m \cdot L_m \cdot (|a_i - a_j|^2 + 2\mathrm{Re}\{\beta^*(a_i - a_j)\}))\right)\right) \cdot f_L(x) \cdot dx. \quad \text{Eq (38)}$$

In equation (38), $SINR_m$ is substituted with $S_m \cdot L_m$, and an integration is performed over the probability density function of SINR loss $L_m$. Equations (36) and (38) indicate that, for a given PDF function $f_L(x)$, the average capacity and hence the rate for transmitter m may be predicted based on an estimated channel norm $|\underline{h}_m|^2$ and an estimated received SINR $P_m/\sigma_o^2$ for transmitter m.

While the above discussion, discusses an embodiment of a SIMO system formed between a single antenna at a transmitter and R antennas at the receiver, the above approach may also be applied to a multi-input multi-output (MIMO) system formed between multiple antennas at a transmitter and R antennas at the receiver. In an embodiment, this may be provided by treating each transmission stream from each antenna at the transmitter as a separate transmitter. In this embodiment, the other transmissions from other antennas at the same transmitter are considered noise. As such in the case where equation 3 is utilized the transmissions from the other antennas may be used in calculating $\underline{n}$. The rate may then be determined as otherwise discussed above, with the provision that the rate determined may be thought of as a floor FIG. 2 shows a process 200 for generating a look-up table of rate versus hypothesized SINR for a given PDF function $f_L(x)$ of SINR loss according to an embodiment. The function $f_L(x)$ is initially determined, e.g., by analytical computation, via computer simulations, based on actual measurements for transmitters in the system, based on an assumption of the worst case channel conditions for the transmitters, or in some other manner (block 212). A value of $S_m$ is selected (block 214). A capacity $C_m$ is computed based on the selected value of $S_m$, the PDF function $f_L(x)$, and a capacity function such as equation (36) or (38) (block 216). A rate $R_m$ is determined for the selected value of $S_m$ based on the computed capacity $C_m$ (block 218). The rate $R_m$ and the selected value of $S_m$ are stored in the look-up table (block 220). If another value of $S_m$ is to be evaluated, as determined in block 222, then the process returns to block 214. Otherwise, the process terminates.

The system may support a set of rates. Table 1 lists an exemplary set of 14 rates supported by the system, which are given indices of 0 through 13. Each supported rate may be associated with a specific data rate or spectral efficiency, a specific modulation scheme, and a specific code rate. Spectral efficiency may be given in units of bits/second/Hertz (bps/Hz).

TABLE 1

| Rate Index | Spectral Efficiency | Code Rate | Modulation Scheme |
|---|---|---|---|
| 0 | 0.0 | — | — |
| 1 | 0.25 | 1/4 | BPSK |
| 2 | 0.5 | 1/2 | BPSK |
| 3 | 1.0 | 1/2 | QPSK |
| 4 | 1.5 | 3/4 | QPSK |
| 5 | 2.0 | 1/2 | 16 QAM |
| 6 | 2.5 | 5/8 | 16 QAM |
| 7 | 3.0 | 3/4 | 16 QAM |
| 8 | 3.5 | 7/12 | 64 QAM |
| 9 | 4.0 | 2/3 | 64 QAM |
| 10 | 4.5 | 3/4 | 64 QAM |
| 11 | 5.0 | 5/6 | 64 QAM |
| 12 | 6.0 | 3/4 | 256 QAM |
| 13 | 7.0 | 7/8 | 256 QAM |

In an embodiment, for block 218 in FIG. 2, the capacity $C_m$ for each value of $S_m$ is compared against the spectral efficiencies for the supported rates, and the supported rate with the highest spectral efficiency that is less than or equal to the capacity $C_m$ is selected for that value of $S_m$. The capacity $C_m$ is effectively quantized to the nearest (lower) rate supported by the system. In another embodiment, a back-off factor is applied to the capacity $C_m$ (e.g., $C_{bo,m} = C_m \cdot K_{bo}$, where $K_{bo} < 1$), and the backed-off capacity $C_{bo,m}$ is compared against the spectral efficiencies for the supported rates to determine the rate for the value of $S_m$. The back-off factor may be used to account for rate prediction errors, which may be due to mischaracterization of the SINR loss, use of an unconstrained capacity function to simplify computation, and so on. The back-off factor may also be accounted for in the computation of $S_m$, in the PDF function $f_L(x)$, in the computation of $C_m$, and so on.

Table 2 shows an exemplary look-up table generated for a specific operating scenario in an exemplary system. For this operating scenario, the receiver is equipped with four antennas (R=4) and there are two co-channel transmitters (M=2). Table 2 shows the average unconstrained capacity (in bps/Hz) and the rate (also in bps/Hz) for different values of $S_m$ (in dB).

TABLE 2

| Hypothesized SINR $S_m$ | Capacity $C_m$ | Rate $R_m$ |
| --- | --- | --- |
| 0.0 | 0.9 | 0.5 |
| 1.0 | 1.0 | 1.0 |
| 2.0 | 1.2 | 1.0 |
| 3.0 | 1.4 | 1.0 |
| 4.0 | 1.6 | 1.5 |
| 5.0 | 1.8 | 1.5 |
| 6.0 | 2.1 | 2.0 |
| 7.0 | 2.3 | 2.0 |
| 8.0 | 2.6 | 2.5 |
| 9.0 | 2.9 | 2.5 |
| 10.0 | 3.2 | 3.0 |

In general, the noise and interference for transmitter m is dependent on various factors such as, for example, (1) the number of co-channel transmitters, which is typically known for the system, (2) the receiver spatial processing technique used by the receiver, which is also known and affects the distribution of $L_m$, (3) the number of antennas at the receiver, (4) the distribution of channel response vectors and the distribution of transmit powers for the co-channel transmitters, and (5) possibly other factors. The noise and interference for transmitter m may not be known exactly if the channel responses and transmit powers for the co-channel transmitters are not known. However, characterized statistics of the noise and interference for transmitter m may be known and may be given in various formats such as, for example, (1) a probability density function of SINR loss $L_m$, as described above, (2) a mean, a standard deviation, and a specific distribution of SINR loss $L_m$ (e.g., a Gaussian distribution that is representative of the worst-case distribution of $L_m$), or (3) some other formats and/or statistics.

FIG. 2 shows the generation of a look-up table of rate versus hypothesized SINR for a specific noise and interference characterization or operating scenario. Process 200 may be performed for different noise and interference characterizations to obtain a look-up table of rate versus hypothesized SINR for each noise and interference characterization. For example, process 200 may be performed for each possible value of M (e.g., for M=1, 2, 3 and so on) to obtain a look-up table for each value of M. M determines the number of co-channel transmitters and hence affects the interference observed by transmitter m from the co-channel transmitters. Process 200 may also be performed for each possible receiver spatial processing technique (e.g., MMSE, zero-forcing, and MRC) to obtain a look-up table for each receiver spatial processing technique. Different receiver processing techniques have different noise and interference characteristics that affect the capacity and hence the rate for a transmitter.

Figure 5A:
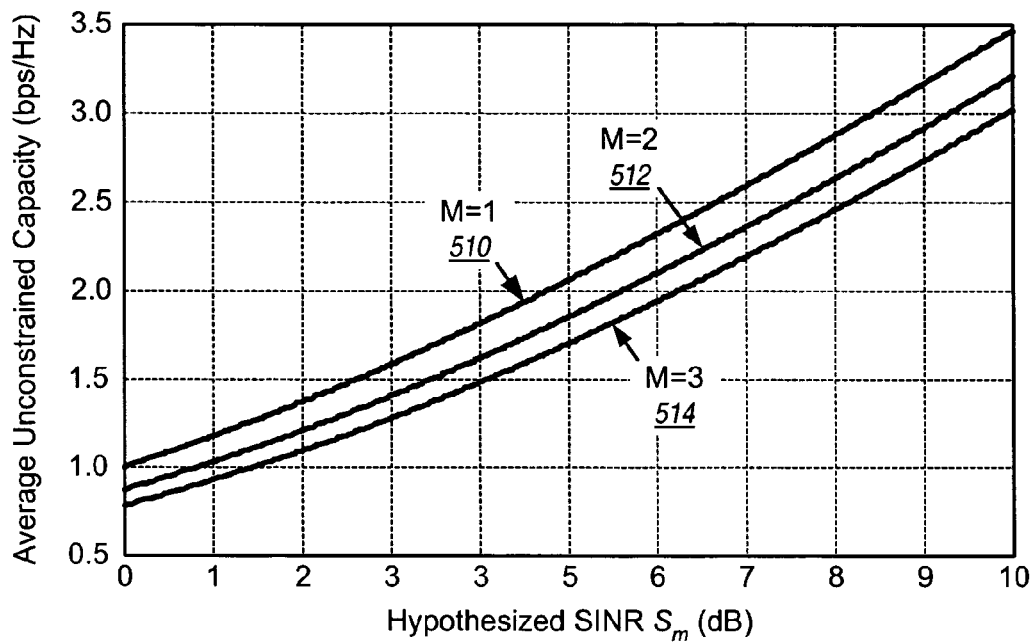
FIGS. 5A and 5B show plots of average unconstrained capacity and average constrained capacity, respectively, versus hypothesized SINR provided according to an embodiment.

FIG. 5A shows plots of the average unconstrained capacity $C_m$ versus hypothesized SINR $S_m$ for the exemplary system described above with four antennas at the receiver and using the MMSE technique. Plots 510, 512, and 514 show the average unconstrained capacity versus hypothesized SINR for M=1, M=2, and M=3, respectively.

Figure 5B:
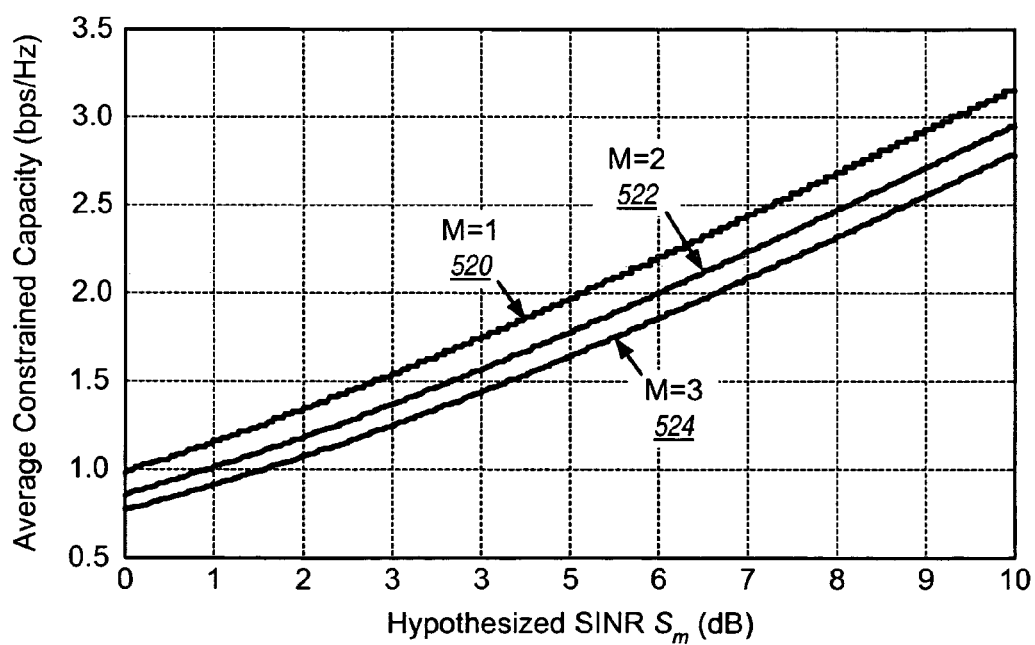

FIG. 5B shows plots of the average constrained capacity $C_m$ versus hypothesized SINR $S_m$ for 16-QAM in the exemplary system noted above with the MMSE technique. Plots 520, 522, and 524 show the average constrained capacity versus hypothesized SINR for M=1, M=2, and M=3, respectively.

FIG. 3 shows a process 300 for selecting a rate for transmitter m. Initially, a channel response vector $\underline{h}_m$ and a received SINR $P_m/\sigma_o^2$ are estimated for transmitter m, e.g., based on a pilot received from transmitter m (block 312), according to an embodiment. A hypothesized SINR $S_m$ is then computed for transmitter m based on the channel response vector and the received SINR, as shown in equation (21) (block 314). Characterized statistics of the noise and interference for transmitter m are determined (block 316). A suitable rate $R_m$ is then selected for transmitter m based on the hypothesized SINR $S_m$ and the characterized statistics of the noise and interference for transmitter m (block 318).

Blocks 316 and 318 in FIG. 3 may be performed implicitly. A different look-up table of rate versus hypothesized SINR may be generated for each different noise and interference characterization. For example, a look-up table may be generated for M=2 and R=3, another look-up table may be generated for M=3 and R=4, and so on. Each look-up table is generated based on the characterized statistics of the noise and interference (e.g., a probability density function of SINR loss $L_m$) applicable for that operating scenario. The rate $R_m$ for transmitter m may then be obtained by applying the computed hypothesized SINR $S_m$ to the look-up table for the noise and interference characterization applicable to transmitter m.

The computation of capacity based on hypothesized SINR and characterized statistics of noise and interference and the mapping of capacity to rate may be performed a priori and stored in one or more look-up tables, as described above in FIG. 2. Alternatively, the noise and interference statistics may be updated based on field measurements, and the capacity computation may be performed in realtime based on the updated statistics of the noise and interference.

For simplicity, the description above assumes that each transmitter is equipped with a single antenna. In general, any number of transmitters may transmit simultaneously to the receiver, and each transmitter may be equipped with any number of antennas, subject to the condition that up to R data streams may be sent simultaneously to the R antennas at the receiver. If one data stream is sent from each transmitter antenna, then M≦R. A transmitter may transmit multiple data streams from multiple antennas, in which case the channel response matrix $\underline{H}$ would include one column for each transmitter antenna. A transmitter may also transmit one data stream from multiple antennas (e.g., using beamforming), in which case the channel response matrix $\underline{H}$ would include one column for an effective communication channel observed by the data stream.

Figure 4:
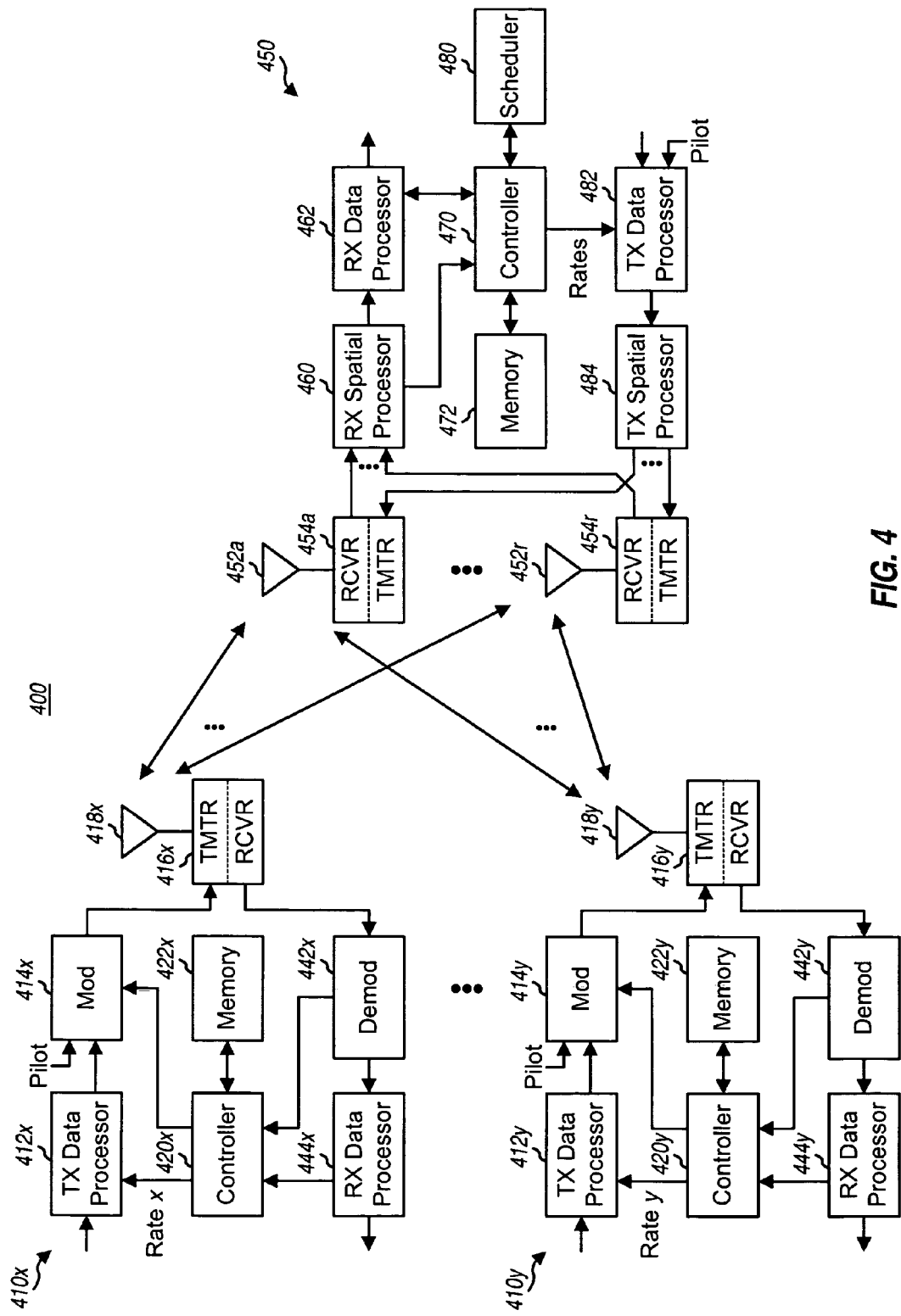
FIG. 4 shows a block diagram of two terminals and a base station according to an embodiment.

FIG. 4 shows a block diagram of two terminals 410x and 410y and a base station 450 in a communication system 400 according to an embodiment. On the reverse link, at each terminal 410, a transmit (TX) data processor 412 encodes, interleaves, and symbol maps traffic and control data and provides data symbols. A modulator (Mod) 414 maps the data symbols and pilot symbols onto the proper subbands and symbol periods, performs OFDM modulation if applicable, and provides a sequence of complex-valued chips. The pilot symbols are used by base station 450 for channel estimation. A transmitter unit (TMTR) 416 conditions (e.g., converts to analog, amplifies, filters, and frequency upconverts) the sequence of chips and generates a reverse link signal, which is transmitted via an antenna 418.

At base station 450, multiple antennas 452a through 452r receive the reverse link signals from terminals 410. Each antenna 452 provides a received signal to a respective receiver unit (RCVR) 454. Each receiver unit 454 conditions (e.g., filters, amplifies, frequency downconverts, and digitizes) its received signal, performs OFDM demodulation if applicable, and provides received symbols. A receive (RX) spatial processor 460 performs receiver spatial processing on the received symbols from all receiver units 454 and provides data symbol estimates. An RX data processor 462 demaps, deinterleaves, and decodes the data symbol estimates and provides decoded data for the terminals.

The processing for forward link transmissions may be performed similarly to that described above for the reverse link. The processing for the transmissions on the forward and reverse links is typically specified by the system.

For rate control, at base station 450, RX spatial processor 460 derives channel estimates (e.g., a channel response estimate $\underline{h}_m$ and a received SINR estimate $P_m/\sigma_o^2$) for each terminal and provides the channel estimates to a controller 470. Controller 470 computes a hypothesized SINR for each terminal based on the channel response estimate and the received SINR estimate for that terminal. Controller 470 then determines a rate for each terminal based on the hypothesized SINR and using, e.g., a look-up table generated by process 200 in FIG. 2. The rates for all terminals are processed by a TX data processor 482 and a TX spatial processor 484, conditioned by transmitter units 454a through 454r, and transmitted via antennas 452a through 452r.

At each terminal 410, antenna 418 receives the forward link signals from base station 450 and provides a received signal to a receiver unit 416. The received signal is conditioned and digitized by receiver unit 416 and further processed by a demodulator (Demod) 442 and an RX data processor 444 to recover the rate sent by base station 450 for the terminal. A controller 420 receives the rate and provides coding and modulation controls to TX data processor 412. Processor 412 generates data symbols based on the coding and modulation controls from controller 420.

Controllers 420x, 420y, and 470 direct the operations of various processing units at terminals 410x and 410y and base station 450, respectively. These controllers may also perform various functions for rate control. For example, controller 470 may implement process 200 and/or 300 shown in FIGS. 2 and 3. Memory units 422x, 422y, and 472 store data and program codes for controllers 420x, 420y, and 470, respectively. A scheduler 480 schedules terminals for data transmission to/from base station 450.

The rate selection techniques described herein may be used for various communication systems. For example, these techniques may be used for a code division multiple access (CDMA) system, a frequency division multiple access (FDMA) system, a time division multiple access (TDMA) system, an orthogonal frequency division multiple access (OFDMA) system, an interleaved frequency division multiple access (IFDMA) system, a spatial division multiple access (SDMA) system, a quasi-orthogonal multiple-access system, and so on. An OFDMA system utilizes orthogonal frequency division multiplexing (OFDM), which partitions the overall system bandwidth into multiple (K) orthogonal frequency subbands. These subbands are also called tones, subcarriers, bins, and so on. Each subband is associated with a respective subcarrier that may be modulated with data.

The rate selection techniques described herein may be implemented by various means. For example, these techniques may be implemented in hardware, software, or a combination thereof. For a hardware implementation, the processing units used to perform rate selection and/or receiver spatial processing at a base station (e.g., RX spatial processor 460 and controller 470) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units at a terminal may also be implemented with one or more ASICs, DSPs, processors, electronic devices, and so on.

For a software implementation, the techniques may be implemented with modules (e.g., procedures, functions, and so on) that perform the functions described herein. The software codes may be stored in a memory unit (e.g., memory unit 472 in FIG. 4) and executed by a processor (e.g., controller 470). The memory unit may be implemented within the processor or external to the processor.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An apparatus comprising:
   a processor operative to derive a channel estimate for a transmitter; and
   a controller operative
      to determine a hypothesized signal-to-noise-and-interference ratio (SINR) for the transmitter based on the channel estimate and
      to select a rate for the transmitter based on
         the hypothesized SINR and
         characterized statistics of noise and interference at a receiver for the transmitter, wherein the characterized statistics of noise and interference are based upon an SINR loss.

2. The apparatus of claim 1, wherein the processor is operative to derive a channel response estimate and a received SINR estimate for the transmitter, and
   wherein the controller is operative to determine the hypothesized SINR for the transmitter based on the channel response estimate and the received SINR estimate.

3. The apparatus of claim 1, further comprising:
   a look-up table operative to store a table of rate versus hypothesized SINR, and
   wherein the controller is operative to access the look-up table with the hypothesized SINR for the transmitter to select the rate for the transmitter.

4. The apparatus of claim 1, wherein the characterized statistics of the noise and interference are represented by a probability density function (PDF) of the SINR loss with respect to the hypothesized SINR.

5. The apparatus of claim 1, wherein the rate corresponds to one of a plurality of transmit antennas of the transmitter.

6. An apparatus comprising:
a processor operative to derive a channel estimate for a transmitter; and
a controller operative
to determine a hypothesized signal-to-noise-and-interference ratio (SINR) for the transmitter based on the channel estimate and
to select a rate for the transmitter based on
the hypothesized SINR and
characterized statistics of noise and interference at a receiver for the transmitter, wherein the controller is operative to determine the characterized statistics of the noise and interference based on the number of other transmitters causing interference to the transmitter, a receiver spatial processing technique used by the receiver, the number of antennas at the receiver, or a combination thereof.

7. An apparatus comprising:
a processor operative to derive a channel estimate for a transmitter; and
a controller operative
to determine a hypothesized signal-to-noise-and-interference ratio (SINR) for the transmitter based on the channel estimate and
to select a rate for the transmitter based on
the hypothesized SINR and
characterized statistics of noise and interference at a receiver for the transmitter, wherein the controller is operative to determine the characterized statistics of the noise and interference based on a minimum mean square error (MMSE) spatial processing technique, a zero-forcing (ZF) spatial processing technique, or a maximal ratio combining (MRC) spatial processing technique used by the receiver.

8. An apparatus comprising:
means for deriving a channel estimate for a transmitter;
means for determining a hypothesized signal-to-noise-and-interference ratio (SINR) for the transmitter based on the channel estimate; and
means for selecting a rate for the transmitter based on the hypothesized SINR and characterized statistics of noise and interference at a receiver for the transmitter, wherein the characterized statistics of noise and interference are based upon an SINR loss.

9. The apparatus of claim 8, wherein the means for deriving the channel estimate comprises means for deriving a channel response estimate and a received SINR estimate for the transmitter, and
wherein the means for determining the hypothesized SINR comprises means for determining the hypothesized SINR for the transmitter based on the channel response estimate and the received SINR estimate.

10. The apparatus of claim 8, further comprising:
means for storing a table of rate versus hypothesized SINR.

11. The apparatus of claim 8, wherein the rate corresponds to one of a plurality of transmit antennas of the transmitter.

12. A method of performing rate control in a communication system, comprising:
deriving a channel estimate for a transmitter;
determining a hypothesized signal-to-noise-and-interference ratio (SINR) for the transmitter based on the channel estimate; and
selecting a rate for the transmitter based on the hypothesized SINR and characterized statistics of noise and interference at a receiver for the transmitter, wherein the characterized statistics of noise and interference are based upon an SINR loss.

13. The method of claim 12, wherein the deriving the channel estimate comprises deriving a channel response estimate and a received SINR estimate for the transmitter, and
wherein the determining the hypothesized SINR comprises determining the hypothesized SINR for the transmitter based on the channel response estimate and the received SINR estimate.

14. The method of claim 12, further comprising:
accessing a look-up table of rate versus hypothesized SINR to obtain the rate for the transmitter.

15. The method of claim 12, wherein the rate corresponds to one of a plurality of transmit antennas of the transmitter.

16. A method comprising:
obtaining a hypothesized signal-to-noise-and-interference ratio (SINR) for a transmitter; and
computing a capacity for the transmitter based on the hypothesized SINR, a probability density function of SINR loss with respect to the hypothesized SINR, and a capacity function.

17. The method of claim 16, further comprising:
selecting a rate for the transmitter based on the capacity for the transmitter.

18. The method of claim 17, further comprising:
storing the rate and the hypothesized SINR in a look-up table.

19. The method of claim 18, further comprising:
repeating the obtaining the hypothesized SINR, the computing the capacity, the selecting the rate, and the storing the rate and the hypothesized SINR for each of a plurality of hypothesized SINRs.

20. The method of claim 17, wherein the rate corresponds to one of a plurality of transmit antennas of the transmitter.

21. The method of claim 16, wherein the obtaining the hypothesized SINR for the transmitter comprises:
determining a channel response estimate and a received SINR estimate for the transmitter; and
computing the hypothesized SINR for the transmitter based on the channel response estimate and the received SINR estimate for the transmitter.

22. The method of claim 16, further comprising:
obtaining the probability density function of SINR loss based on field measurements, computer simulations, analytical computations, or a combination thereof.

23. The method of claim 16, further comprising:
updating the probability density function of SINR loss based on field measurements.

24. The method of claim 16, wherein the computing the capacity for the transmitter comprises
computing the capacity for the transmitter based on the hypothesized SINR, the probability density function of SINR loss, and an unconstrained capacity function.

25. The method of claim 16, wherein the computing the capacity for the transmitter comprises
computing the capacity for the transmitter based on the hypothesized SINR, the probability density function of SINR loss, and a constrained capacity function.

26. The method of claim 16, wherein the computing the capacity for the transmitter comprises
   computing the capacity for the transmitter based on the hypothesized SINR, the probability density function of SINR loss, the capacity function, and a back-off factor.

27. An apparatus comprising:
   means for obtaining a hypothesized signal-to-noise-and-interference ratio (SINR) for a transmitter; and
   means for computing a capacity for the transmitter based on the hypothesized SINR, a probability density function of SINR loss with respect to the hypothesized SINR, and a capacity function.

28. The apparatus of claim 27, further comprising:
   means for selecting a rate for the transmitter based on the capacity for the transmitter.

29. The apparatus of claim 28, further comprising:
   means for storing the rate and the hypothesized SINR.

30. The apparatus of claim 28, wherein the rate corresponds to one of a plurality of transmit antennas of the transmitter.

31. The apparatus of claim 27, wherein the means for obtaining comprises means for determining a channel response estimate and a received SINR estimate for the transmitter and means for computing the hypothesized SINR for the transmitter based on the channel response estimate and the received SINR estimate for the transmitter.

32. The apparatus of claim 27, wherein the means for computing comprises means for computing the capacity for the transmitter based on the hypothesized SINR, the probability density function of SINR loss, and an unconstrained capacity function.

33. The apparatus of claim 27, wherein the means for computing comprises means for computing the capacity for the transmitter based on the hypothesized SINR, the probability density function of SINR loss, and a constrained capacity function.

34. The apparatus of claim 27, wherein the means for computing comprises means for computing the capacity for the transmitter based on the hypothesized SINR, the probability density function of SINR loss, the capacity function, and a back-off factor.

35. The apparatus of claim 27, further comprising a look-up table coupled with the controller, the look-up table storing the rate and the hypothesized SINR.

36. An apparatus comprising:
   a controller operative to receive a rate selected for the apparatus based on a hypothesized signal-to-noise-and-interference ratio (SINR) for the apparatus and characterized statistics of noise and interference observed at a receiver for the apparatus, wherein the characterized statistics of noise and interference are based upon an SINR loss; and
   a processor operative to process data in accordance with the rate selected for the apparatus.

37. The apparatus of claim 36, wherein the processor is further operative to generate a pilot used to determine the hypothesized SINR for the apparatus.

38. The apparatus of claim 36, wherein the controller is operative to determine a channel response estimate and a received SINR estimate for the apparatus, and to compute the hypothesized SINR based on the channel response estimate and the received SINR estimate.

39. The apparatus of claim 36, further comprising a plurality of receive antennas.

40. The apparatus of claim 36, wherein the controller is operative to compute the capacity for the transmitter based on the hypothesized SINR, the probability density function of the SINR loss, and an unconstrained capacity function.

41. The apparatus of claim 36, wherein the controller is operative to compute the capacity for the transmitter based on the hypothesized SINR, the probability density function of the SINR loss, and a constrained capacity function.

42. The apparatus of claim 36, wherein the controller is operative to compute the capacity for the transmitter based on the hypothesized SINR, the probability density function of the SINR loss, the capacity function, and a back-off factor.

43. A computer readable medium including instructions for execution on a controller, comprising:
   instructions to derive a channel estimate for a transmitter;
   instructions to determine a hypothesized signal-to-noise-and-interference ratio (SINR) for the transmitter based on the channel estimate; and
   instructions to select a rate for the transmitter based on the hypothesized SINR and characterized statistics of noise and interference at a receiver for the transmitter, wherein the characterized statistics are based upon an SINR loss.

44. A computer readable medium including instructions for execution on a controller, comprising:
   instructions to obtain a hypothesized signal-to-noise-and-interference ratio (SINR) for a transmitter; and
   instructions to compute a capacity for the transmitter based on the hypothesized SINR, a probability density function of SINR loss with respect to the hypothesized SINR, and a capacity function.

45. The computer readable medium of claim 44, further comprising:
   instructions to select a rate for the transmitter based on the capacity for the transmitter.

46. The computer readable medium of claim 45, further comprising:
   instructions to store the rate and the hypothesized SINR in a look-up table.

47. The computer readable medium of claim 46, further comprising:
   instructions to repeat the instructions to obtain the hypothesized SINR, compute the capacity, select the rate, and store the rate and the hypothesized SINR for each of a plurality of hypothesized SINRs.

48. The computer readable medium of claim 44, further comprising:
   instructions to obtain the probability density function of SINR loss based on field measurements, computer simulations, analytical computations, or a combination thereof.

49. The computer readable medium of claim 44, further comprising:
   instructions to update the probability density function of SINR loss based on field measurements.

50. An apparatus, comprising:
   means for deriving a channel estimate for a transmitter;
   means for determining an hypothesized signal-to-noise-and-interference ratio (SINR) for the transmitter based on the channel estimate;
   means for determining characterized statistics of the noise and interference based on a number of other transmitters causing interference to the transmitter, a receiver spatial processing technique used by the receiver, the number of antennas at the receiver, or a combination thereof; and
   means for selecting a rate for the transmitter based on the hypothesized SINR and the characterized statistics of noise and interference at a receiver for the transmitter.

51. A method, comprising:
- deriving a channel estimate for a transmitter;
- determining an hypothesized signal-to-noise-and-interference ratio (SINR) for the transmitter based on the channel estimate;
- determining characterized statistics of the noise and interference based on a number of other transmitters causing interference to the transmitter, a receiver spatial processing technique used by the receiver, the number of antennas at the receiver, or a combination thereof; and
- selecting a rate for the transmitter based on the hypothesized SINR and the characterized statistics of noise and interference at a receiver for the transmitter.

52. A computer readable medium, including instructions for execution on a controller, comprising:
- instructions to derive a channel estimate for a transmitter;
- instructions to determine an hypothesized signal-to-noise-and-interference ratio (SINR) for the transmitter based on the channel estimate;
- instructions to determine characterized statistics of the noise and interference based on a number of other transmitters causing interference to the transmitter, a receiver spatial processing technique used by the receiver, the number of antennas at the receiver, or a combination thereof; and
- instructions to select a rate for the transmitter based on the hypothesized SINR and the characterized statistics of noise and interference at a receiver for the transmitter.

53. An apparatus, comprising:
- means for deriving a channel estimate for a transmitter;
- means for determining a hypothesized signal-to-noise-and-interference ratio (SINR) for the transmitter based on the channel estimate;
- means for determining characterized statistics of the noise and interference based on a minimum mean square error (MMSE) spatial processing technique, a zero-forcing (ZF) spatial processing technique, or a maximal ratio combining (MRC) spatial processing technique used by the receiver; and
- means for selecting a rate for the transmitter based on the hypothesized SINR and the characterized statistics of noise and interference at a receiver for the transmitter.

54. A method, comprising:
- deriving a channel estimate for a transmitter;
- determining a hypothesized signal-to-noise-and-interference ratio (SINR) for the transmitter based on the channel estimate;
- determining characterized statistics of the noise and interference based on a minimum mean square error (MMSE) spatial processing technique, a zero-forcing (ZF) spatial processing technique, or a maximal ratio combining (MRC) spatial processing technique used by the receiver; and
- selecting a rate for the transmitter based on the hypothesized SINR and the characterized statistics of noise and interference at a receiver for the transmitter.

55. A computer readable medium, including instructions for execution on a controller, comprising:
- instructions to derive a channel estimate for a transmitter;
- instructions to determine a hypothesized signal-to-noise-and-interference ratio (SINR) for the transmitter based on the channel estimate;
- instructions to determine characterized statistics of the noise and interference based on a minimum mean square error (MMSE) spatial processing technique, a zero-forcing (ZF) spatial processing technique, or a maximal ratio combining (MRC) spatial processing technique used by the receiver; and
- instructions to select a rate for the transmitter based on the hypothesized SINR and the characterized statistics of noise and interference at a receiver for the transmitter.

56. An apparatus, comprising:
- a processor operative to derive a channel estimate for a transmitter; and
- a controller operative
  - to obtain a hypothesized signal-to-noise-and-interference ratio (SINR) for the transmitter based on the channel estimate, and
  - to compute a capacity for the transmitter based on the hypothesized SINR, a probability density function of SINR loss with respect to the hypothesized SINR, and a capacity function.

57. The apparatus of claim 56, wherein the controller is operative to select a rate for the transmitter based on the capacity for the transmitter.

58. The apparatus of claim 57, wherein the rate corresponds to one of a plurality of transmit antennas of the transmitter.

59. The apparatus of claim 56, wherein the controller is operative to obtain the probability density function of SINR loss based on field measurements, computer simulations, analytical computations, or a combination thereof.

60. The apparatus of claim 56, wherein computing the capacity for the transmitter includes computing the capacity for the transmitter based on the hypothesized SINR, the probability density function of SINR loss, and an unconstrained capacity function.

61. The apparatus of claim 56, wherein selecting the capacity for the transmitter includes computing the capacity for the transmitter based on the hypothesized SINR, the probability density function of SINR loss, and a constrained capacity function.

62. The apparatus of claim 56, wherein selecting the capacity for the transmitter includes computing the capacity for the transmitter based on the hypothesized SINR, the probability density function of SINR loss, the capacity function, and a back-off factor.

* * * * *